United States Patent [19]

Kaufmann et al.

[11] 4,151,964

[45] May 1, 1979

[54] APPARATUS AND METHOD FOR MANUFACTURE OF BELL-SHAPED ARMATURES

[75] Inventors: Hubert Kaufmann, Bonndorf; Ernst Volz, Bonndorf-Wellendingen; Hartmut Hoeft, Bonndorf, all of Fed. Rep. of Germany

[73] Assignee: International Standard Electric Corporation, New York, N.Y.

[21] Appl. No.: 866,011

[22] Filed: Dec. 30, 1977

[30] Foreign Application Priority Data

Jan. 5, 1977 [DE] Fed. Rep. of Germany ....... 2700282

[51] Int. Cl.² ........................................... H02K 15/04
[52] U.S. Cl. ................... 242/7.04; 140/92.1; 242/2; 242/7.14
[58] Field of Search .................... 242/7.14, 7.15, 7.16, 242/7.04, 7.05, 3, 2; 140/92.1

[56] References Cited

U.S. PATENT DOCUMENTS

| | | | |
|---|---|---|---|
| 501,186 | 7/1893 | Hetzel | 242/2 |
| 1,409,671 | 3/1922 | Clauss | 242/2 |

*Primary Examiner*—George F. Mautz
*Attorney, Agent, or Firm*—William O'Neil

[57] ABSTRACT

Apparatus and method for manufacture of bell-shaped, air core armatures for fractional horse power electrical d.c. motors. A metal wire is wound on a slantingly in relation to the armature axis uninterruptedly in such a way as to form triangular equal-sided conductor fields. For winding, the wire is led around the outer edges by two guiding devices of which one is arranged at the upper end, and the other at the lower end of a rotable cylindrical auxiliary device. The windings are staggered with respect to each other by 180° electrically. One turn of the winding is placed next to the other until the armature winding is completed. The apparatus includes a cylindrical auxiliary device with tape-like guiding means clamped on the surface of the device or mandrel, the guiding means extending tangentially in relation to the mandrel cylindrical surface.

6 Claims, 6 Drawing Figures

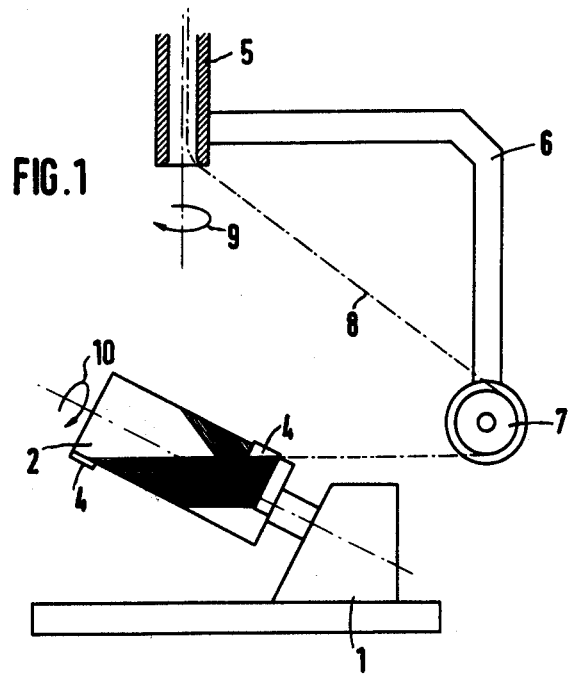
FIG.1
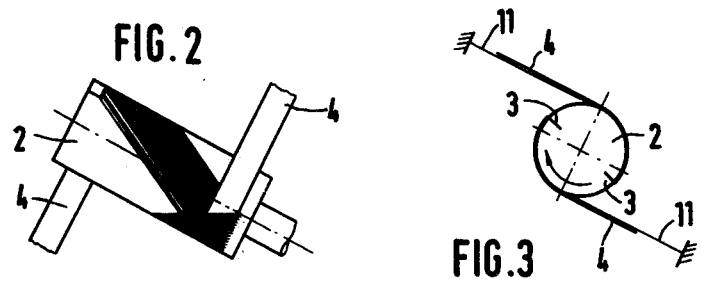
FIG.2
FIG.3

APPARATUS AND METHOD FOR MANUFACTURE OF BELL-SHAPED ARMATURES

BACKGROUND OF THE INVENTION

The present invention relates to a method and apparatus for manufacturing the armature winding of self-supporting, cylindrical, pot-shaped armatures of the so-called bell-shaped armature type, for electrical machines, such as fractional horse power direct current machines. A conducting wire is wound slantingly in relation to the armature axis, uninterruptedly, in at least two layers in such a way as to form triangular equal-sided conductor fields, with the number of fields corresponding to the number of poles of the machine. The wire changes over at the sides of the fields from one layer into the next one, and wire terminals are formed on one end face of the armature for establishing connections to commutator segments or current supply leads.

One prior art structure and method is known from German Pat. No. 1,463,855. In this conventional method a winding mandrel provided with hold pins is used for manufacturing the armature winding. In manufacturing the armature, the wire is led in a zigzag line around the hold pins.

This conventional apparatus and method, has been used for manufacturing the aforementioned armature windings, but has some disadvantages. One of these drawbacks resides in the fact that the winding, especially of several wires over one pin, causes an unwanted thickening or build up of the armature winding at its ends. Moreover, the auxiliary device which is provided with a plurality of pins, is relatively costly. Still further, armature windings of different diameter and different length require special auxiliary devices of their own.

SUMMARY

It was the general object of the invention, therefore, to provide a simplified method of manufacturing such cylindrical armature windings permitting manufacture of armature windings having uniform wall thicknesses, i.e. practically without any thickened portions. Moreover, the device required for carrying out the method, that was, especially the auxiliary device, is to be improved in such a way as to provide versatility of service.

According to the invention, this object is achieved in that the wire, by applying a winding pitch of electrically exactly 180°, is led around the outer edges by two guiding devices of which the one is arranged at the upper, and the other one at the lower end of a rotatable cylindrical auxiliary device (mandrel), and staggered with respect to one another by electrically exactly 180°, by extending tangentially with respect to the surface of the device, with one turn of the winding being placed next to the other, this being continued until the armature winding is completed, the cylindrical auxiliary device being advanced in a step-by-step manner in the circumferential direction following one or more winding pitches.

The novel apparatus and the method will be explained hereinafter with reference to FIGS. 1 to 6 of the accompanying drawings, in which:

FIG. 1 schematically shows one embodiment of the device for winding the armature winding of a two-pole motor in a side view.

FIG. 2 is the top view of the auxiliary device as shown in FIG. 1.

FIG. 3 is the front view of the auxiliary device according to FIGS. 1 and 2.

Figure 6:
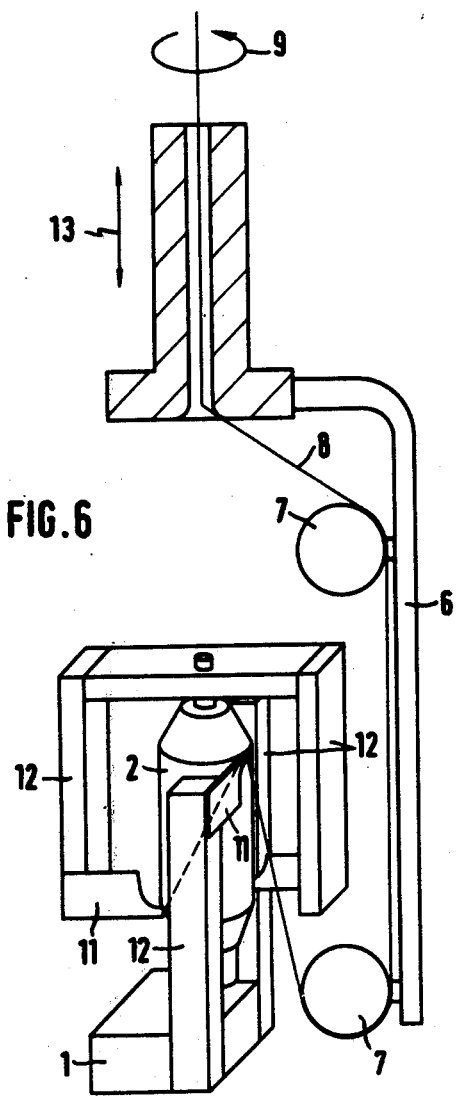

FIG. 6 schematically shows an embodiment of the device for winding the armature winding of a four-pole motor, in a side view.

DETAILED DESCRIPTION

As is shown in FIG. 1, that particular embodiment of the winding device consists of the stand 1 to which the cylindrical auxiliary device 2 is mounted rotatably and is driven in the circumferential direction. The auxiliary device - as is clearly recognizable in particular from FIG. 3 - is provided with two slots 3 extending in parallel with the axis, with these slots being arranged on the circumference staggered with respect to one another by 180 angular degrees. In these slots there is secured one end of the guiding devices 4 which, in the given example, are thin tapes of plastic or paper saturated or coated with plastic and which, with their remaining length, inasfar as not resting on the surface of the auxiliary device, are held by being tightly tensioned and extend tangentially in relation to the surface of the mandrel 2 of the auxiliary device. This is jointly illustrated in FIGS. 2 and 3. Moreover, above the aforementioned part of the device, there is arranged a rotatably driven wire supply and winding device consisting of the hollow shaft 5, the angled-off winding arm 6 as mounted thereto, and the guide pulley 7 mounted to the other end thereof. This guide pulley 7 is arranged at such a height that the winding wire 8 as supplied through the hollow shaft 5 and led around the guide pulley 7 is paid out in direction to the cylindrical auxiliary device 2 almost in alignment with the diagonal thereof.

When coiling a stator winding the hollow shaft 5 and with it arm 6 and pulley 7 rotates in the direction as indicated by the arrow 9, and the cylindrical auxiliary device 2 rotates in the direction as indicated by the arrow 10 in a way adapted to one another. For example, after one rotation of the hollow shaft 5, the auxiliary device 2 is turned by the winding wire diameter in the circumferential direction as indicated by the arrow 10. However, alternatively several turns may be wound on top of each other at the same point before the auxiliary device 2 is turned on by one step in the circumferential direction indicated by the arrow 10.

Before the winding process is started, the beginning of the winding wire is secured on the auxiliary device 2, for example, by being clamped under the tape 4. When the winding device is started, the winding arm 6, during the first half rotation of the hollow shaft 5, applies the winding wire slantingly to the surface of the cylindrical auxiliary device 2. The winding wire 8 runs underneath the tape 4 at the left-hand end of the auxiliary device 2 and is redirected, upon further rotation of the hollow shaft 5, at the outer edge of the tape 4 and, during the continued rotation, is again slantingly applied to the surface of the cylindrical auxiliary device 2 before returning to its starting point at the outer edge of the right-hand tape 4 where it is again redirected during the continued rotation. If, in this position, the auxiliary device 2 is turned by the diameter of the wire, and during the uninterrupted rotation of the hollow shaft 5, always one turn of winding is placed next to the other until the armature winding is completed. In the course of this, the tape 4 is wound into the armature winding. After having temporarily stabilized the armature winding, this tape may be removed. However, it may also remain in the armature winding, in which case, provided that the tape is made of plastics, it may be incorporated in the armature winding during the subsequent thermal compression and solidification process, without causing a thickening of the armature winding.

Figure 4:
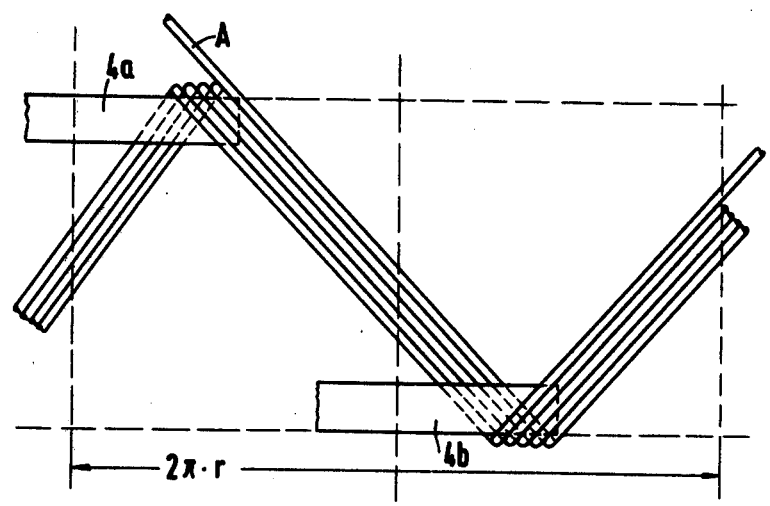
FIG. 4 shows the development of an armature winding partly wound onto the auxiliary device, for a two-pole motor.

The winding process as described hereinbefore, is illustrated in FIG. 4 showing the development of the surface of the cylindrical auxiliary device carrying one partial winding. The winding itself is started with the end A of the winding wire at the clamping point of the tape 4a. The winding wire places itself slantingly over half the circumference of the auxiliary device, is then redirected by the outer edge of the tape 4b, and runs slantingly over the remaining half of the circumference of the auxiliary device before returning to its starting point at the outer edge of the tape 4a where it is again redirected and placed next to the first turn of the winding. In FIG. 4 five turns are shown to have been wound in this way.

In cases where the edges of the tape 4 are incapable of providing sufficient rigidity to redirecting the winding wire whenever armature windings of relatively heavy wires have to be manufactured with the method and the device according to the invention, it is appropriate to reinforce the tape by a pin arranged directly at its outer edge, or by a rigid sheet-metal strip 11 arranged either below or above the tape (FIG. 3), which is then firmly clamped with its end not facing the auxiliary device 2, and extends in a self-supporting manner up to shortly in front of the point where the tape 4 comes to lie on the surface of the auxiliary device 2.

Figure 5:
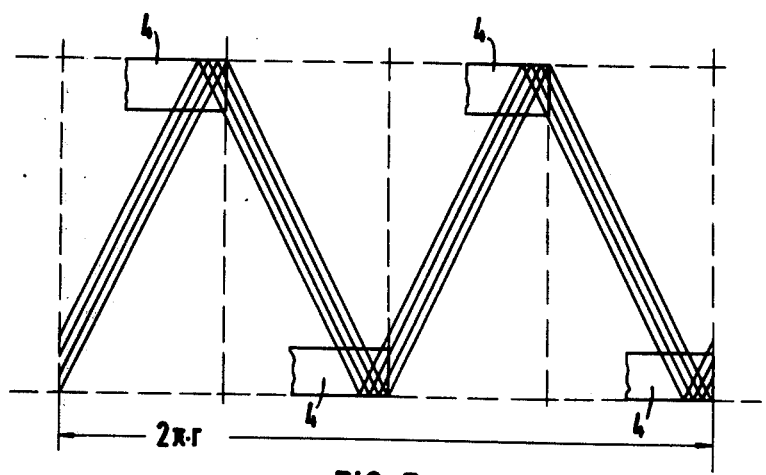
FIG. 5 shows the development of an armature winding partly wound onto the auxiliary device, for a four-pole motor.

In accordance with the same principle as described in the foregoing with reference to an armature winding for a two-pole motor, it is also possible to manufacture armature windings for multi-pole motors. FIG. 5 shows the development of the cylindrical auxiliary device after some turns of a four-pole armature winding have been wound. The circumference is the same as in FIG. 3, but the pitch of the wound wire is higher, in fact, this wire has to be redirected four times at the guiding devices 4 in the course of one single rotation around the auxiliary device. For reasons of simplicity, the winding wire is only represented by lines in FIG. 5.

FIG. 6 shows a device for manufacturing a multi-pole armature winding, such as the four-pole armature winding as shown in FIG. 5. This device likewise comprises a stand 1 on which the controlled rotatable cylindrical auxiliary device is mounted vertically in a standing-up position. Both the hollow shaft and the winding arm 6 are designed similar to those of embodiment shown in FIG. 1, with the exception, however, that two guide pulleys 7 are attached to the winding arm 6, between which the winding wire 8 is led straightforward. In addition, at the holders 12 on both sides of the cylindrical auxiliary device 2, there are arranged the rigid guiding devices 11 as already mentioned in connection with FIG. 3. The flexible guiding devices 4 have been omitted in FIG. 6 for the sake of clarity. The device as shown in FIG. 6 differs from that of FIG. 1 in that both the hollow shaft 5 and the winding arm 6, during the winding process, in addition the rotation in the direction as indicated by the arrow 9, also perform an upward or downward movement between two redirections, as is indicated by the arrow 13.

With the aid of the method and the devices described hereinbefore, it is possible in a simple way to manufacture cylindrical armatures for use in fractional horsepower direct current machines, with practically no thickening at the cylinder ends. Apart therefrom, there is only required one cylindrical auxiliary device for all kinds of armature diameters, because the guiding devices 4 can be arranged at any arbitrary longitudinal distance from one another thus permitting armature windings of any required lengths to be manufactured using the same auxiliary device.

What is claimed is:

1. The method of manufacturing a self-supporting, cylindrical, bell-shaped armature particularly for a fractional horsepower, electric motor comprising the steps of:

winding a conductive wire on a generally cylindrical mandrel slantingly in relation to the axis of said armature to be produced, said winding being effected uninterruptedly in at least two layers in such a way as to produce a corresponding equal-sided, generally triangular conductor field for each pole of said motor, said winding have a winding pitch of 180 electrical degrees;

tangentially extending first and second tape-like guided adjacent first and second ends of said mandrel and staggering said guides circumferentially about said mandrel by 180° so as to guide said wire around the corners of said winding;

advancing said mandrel rotationally and step-wise by an amount along its surface equal to d every n turns of said winding, where n is an integer and d is the diameter of the wire being used, said tangential relationship of said tape-like guides with respect to said mandrel being maintained during said rotational advancement of said mandrel.

2. A machine for winding self-supporting, ironless, cylindrical, bell-shaped armatures particularly for fractional horsepower motors, comprising:

first means including a generally cylindrical mandrel rotatably mounted about a first axis;

second means for feeding out a wire from a supply and winding it about said mandrel, said first means having an arm and rotating means therefor and a delivery pulley at the end of said arm, said pulley following a circular path in a plane at a predetermined angle with respect to said first axis such that said winding occurs at a corresponding angle on said mandrel;

and third means comprising tape-like guides for said wire to effect change of winding direction at the winding corners, said guides being spaced at points a predetermined distance axially on said mandrel as a function of the diameter of the armature to be produced, said guides extending tangentially with respect to the surface of said mandrel from said points, said points being circumferentially staggered by an angle corresponding to 180 electrical degrees of the armature to be produced.

3. Apparatus according to claim 2 in which fourth means are included for advancing said mandrel rotationally, by an amount which is a function of the diameter of the wire being wound thereon, for each n turns applied by said second means, where n is an integer having a value of one or more.

4. Apparatus according to claim 3 in which means are included for maintaining said tangential guide extension as said fourth means advances said mandrel rotationally.

5. Apparatus according to claim 2 in which said guide means includes means for stiffening said tape-like guides, especially at the edges thereof, to accommodate relatively large diameter wire without substantial deformation.

6. Apparatus according to claim 4 in which said guide means includes means for stiffening said tape-like guides, especially at the edges thereof, to accommodate relatively large diameter wire without substantial deformation.

* * * * *